United States Patent [19]

Souter

[11] Patent Number: 5,137,622
[45] Date of Patent: Aug. 11, 1992

[54] FILTER SCREEN ASSEMBLY

[75] Inventor: George L. Souter, Aberdeen, Scotland

[73] Assignee: United Wire Limited, Edinburgh, Scotland

[21] Appl. No.: 502,824

[22] Filed: Apr. 2, 1990

Related U.S. Application Data

[63] Continuation-in-part of Ser. No. 249,973, Sep. 27, 1988, abandoned.

[51] Int. Cl.⁵ .................................................. B07B 1/46
[52] U.S. Cl. ..................................... 209/403; 209/408; 210/499
[58] Field of Search ............... 209/269, 273, 311, 315, 209/319, 352, 353, 392, 397, 399–401, 403–405, 412, 414, 408; 210/498, 499

[56] References Cited

U.S. PATENT DOCUMENTS

| | | | |
|---|---|---|---|
| 3,664,503 | 5/1972 | Feldon | 209/397 |
| 3,875,065 | 4/1975 | Rosenblum | 209/403 X |
| 4,190,527 | 2/1980 | Spiller | 209/392 X |
| 4,219,412 | 8/1980 | Hassall | 209/399 |
| 4,861,462 | 8/1989 | Lehmann et al. | 209/397 X |
| 4,885,040 | 12/1989 | Wolff | 209/399 X |

FOREIGN PATENT DOCUMENTS

| | | | |
|---|---|---|---|
| 0171296 | 11/1951 | Austria | 209/403 |
| 2754374 | 6/1979 | Fed. Rep. of Germany | 209/399 |
| 2076489 | 10/1971 | France | 210/499 |

Primary Examiner—Michael S. Huppert
Assistant Examiner—Edward M. Wacyra
Attorney, Agent, or Firm—Lee, Mann, Smith, McWilliams & Sweeney

[57] ABSTRACT

An assembly comprises a rectangular principal frame (12) of moulded plastics material and subdivided by crosspieces (14, 16) to form sub-areas (18). Each sub-area receives as a releasable snap-fit a plastics moulded insert (20) in the form of a sub-frame carrying one or more tensioned screen meshes (FIG. 1). A peripheral sealing gasket may seal the joint between each sub-area (18) and the insert (20).

10 Claims, 1 Drawing Sheet

FILTER SCREEN ASSEMBLY

RELATED APPLICATION

This application is a continuation-in-part of U.S. Pat. application Ser. No. 249,973, filed Sep. 27, 1988, and now abandoned.

FIELD OF THE INVENTION

This invention relates to a filter screen assembly, and more especially a filter screen assembly of the kind which in use is located in a vibrating basket of a filtering machine for the treatment of slurries or the like.

BACKGROUND TO THE INVENTION

A filter screen assembly conventionally comprises a steel frame with one or more filtering meshes secured and tensioned over its area. In use, the mesh can become damaged, creating holes through which can pass material which the mesh is intended to hold back. Replacement of the mesh in such an event is expensive and time consuming, requiring removal of the frame from the machine, removal of the damaged mesh, replacement by a new mesh and tensioning of the latter, and replacement of the frame in the machine.

It is known to effect patching of a damaged mesh with metal sheet patches or, in the case of a multiple mesh assembly, to bond the two meshes together at the site of damage. The former procedure results in diminished throughput, whilst the latter results in reduced efficiency of the so-called blinding action which is intended to take place in use, whereby the differential vibrations of the two meshes serve to dislodge material tending to clog the upper mesh. Both procedures, whilst more economical than replacement of a complete mesh, are just as time consuming as a complete mesh replacement.

It has been proposed in U.S. Pat. No. 4219412 to Hassell to provide a screen assembly comprising a latticed support frame into the apertures of which are force fitted sieve elements. Such elements are made of a synthetic plastics material, such as polyurethane, and no tensioning of the sieve occurs. In fact, the disclosed fitting of the element in each aperture is such that if there were any tensioning in the sieve, it would tend to be reduced after fitting. Furthermore, there is no teaching in Hassell of any of the sieve elements being replaceable, eg for repair. Indeed the Hassell system seems to be aimed at the manufacture of the original product—not the repair or replacement of brother parts.

In U.S. Pat. No. 7875065 to Rosenblum there is disclosed a tensioned circular filter screen adapted to be force fitted over an annular lip of a frame to increase the tension in the screen. The screen is intended to be permanently secured, and so cannot be readily removed from the frame. There is no suggestion in Rosenblum that a plurality of such screens could be used as sieve elements in a latticed support frame as in Hassell, even if the force fitting were compatible.

It is therefore an object of the present invention to provide an improved filter screen assembly in which the filter mesh elements are readily replaceable in the principal frame, and are adapted in fitting to at least maintain the tension in the mesh.

THE INVENTION

According to one aspect of the present invention, there is provided a filter screen assembly comprising a principal frame subdivided into a plurality of equally sized sub-areas, each sub-area having an inwardly directed lip, and a corresponding plurality of screen inserts snap-fitted into engagement within said sub-areas, each insert having a sub-frame with a tensioned filter mesh securably attached thereacross, whereby interengagement with said lips serves to at least maintain the tension in the mesh.

According to another aspect of the invention, there is provided a method of constructing a filter screen assembly comprising a principal frame subdivided into a plurality of equally sized sub-areas, and including a corresponding plurality of screen inserts engageable within said sub-areas, each insert having a sub-frame adapted to support a tensioned filter mesh thereon, comprising the steps of assembling the sub-frames in the principal frame, tensioning a filter mesh over the principal frame so as to cover each sub frame, bonding the mesh around each sub-frame without bonding the mesh to the principal frame, cutting the mesh around the periphery of each sub-frame, and removing the surplus portions of mesh.

Preferably, the principal frame and the sub-frames of the inserts are of moulded plastics material. A preferred plastics material is a glass-fibre reinforced plastics material, such as a mouldable polyester compound.

A preferred principal frame is of rectangular shape, divided by cross-pieces extending in two mutually perpendicular directions parallel to the sides of the frame. This principal frame thus takes the general form of a window frame divided by mullions and transoms.

The invention is applicable to filter screen assemblies of the kind having only a single mesh layer or of the kind having two or more superimposed mesh layers. In the latter case, each sub-area of the principal frame may receive two or more inserts in overling relationship, or a single insert may carry two or more overlying meshes.

If desired, each sub-area of the principal frame, or possibly each insert, may be equipped with a rubber or like seal for acting to seal the joint between the principal frame and the insert when the latter is secured in position.

DESCRIPTION OF EMBODIMENT

A filter screen in accordance with the invention is exemplified in the following description and with reference to the accompanying drawings, in which FIG. 1 is an exploded perspective view of the filter screen assembly;

Figure 1:
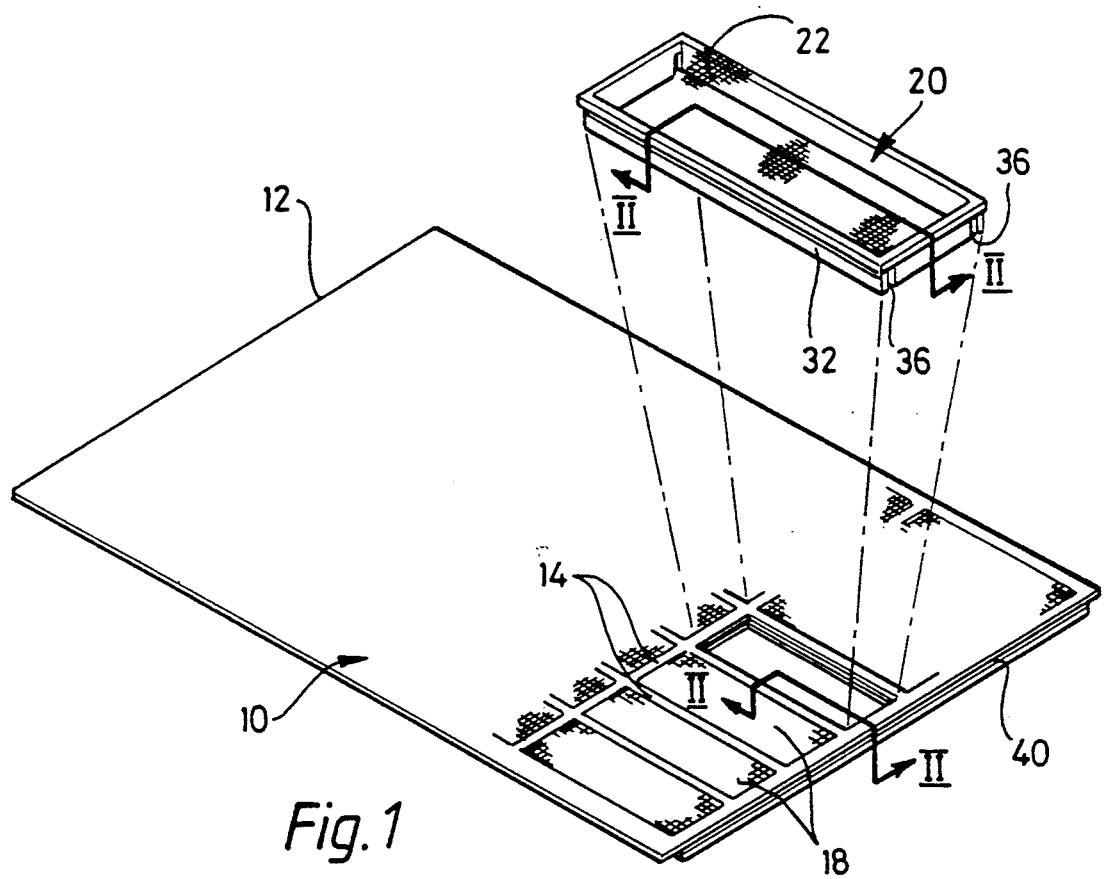

Referring to the drawings, a rectangular principal frame 10 is moulded of glass-fibre reinforced polyester resin compound. The frame 10 consists of a border 12 sub-divided divided by integrally formed cross-pieces or interstices 14 into equally shaped and sized rectangular sub-areas 18.

An insert for each sub-area comprises a sub-frame 20 moulded of like material and to which is bonded a screen mesh 22 tensioned over its area.

Figure 2:
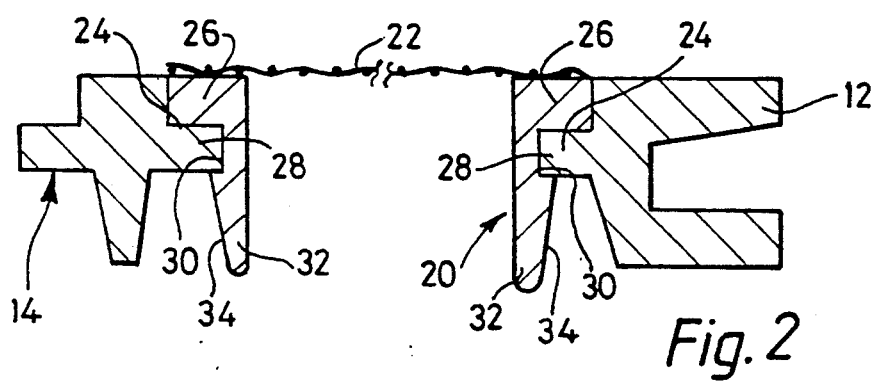
FIG. 2 is an enlarged cross-sectional view on the line II—II of FIG. 1.

Referring particularly to FIG. 2, the periphery of each sub-area 18 of the principal frame 10 and of the sub-frame 20 are mutually shaped to enable the insert to be secured as a press fit or snap fit into the sub-area.

Thus the cross-pieces 14 and the border 12 which define each sub-area 18 are formed with a peripheral rabbet 24 for receiving a correspondingly shaped upper portion 26 of the sub-frame 20. It will be seen that the top surfaces of the sub-frames are flush with the top surfaces of the principal frame.

The bottom of each rabbet 24 is constituted as a lip 28 which engages with a corresponding groove 30 formed in the sub-frame 20. Below each groove 30 is a dependent ledge or fir-tree 32 whose outer surface 34 tapers inwards towards the bottom. When the sub-frame 20 is inserted in the sub-area 18 the outer surface 34 is cammed over the respective lip 28 until the groove 30 snaps into place around the lip. Release of the sub-frame is effected by pressing in the four ledges 32 and pushing them upwards. This may be done by hand, but could more easily be performed by a suitable tool.

It will be appreciated that any twisting of the sub-frame, by inward pressure on the surfaces 34, will tend to force apart the top surfaces of the portions 26 to which the mesh 22 is secured. Therefore, depending on the degree of press fit between the lips 28 and the grooves 30, the tension in the mesh 22 will be increased, or at any rate will be maintained constant.

In order to ensure that adjacent ledges 32 do not interfere at the corners when they are pressed inwards, a gap 36 is left at each corner between adjacent ledges.

In use, when any screen mesh 22 in the assembly becomes damaged, it is only necessary to replace the insert containing the site of damage by a fresh insert. In some instances this may be possible without even necessitating the requirement to remove the filter screen assembly from the vibratory basket of the filtering machine.

It may not be necessary for the two opposite shorter ledges 32 to be formed with grooves 30, in which case the thickness of those ledges will remain constant. The sub-frames can then be more easily removed merely by applying finger pressure inwards and then upwards against the opposite outer surfaces 34 of the two longer ledges 32.

Although not shown, it will be apparent that each insert could be provided with a plurality of overlying filter meshes. Alternatively, or additionally, each sub-area of the principal frame could be arranged to accept a plurality of inserts lying one over the other.

It will be seen from FIG. 2 that the section of the cross-pieces 14 is symmetrical about a vertical axis. In the case of the border 12 of the frame 10, a deep groove 40 is formed along the shorter side, and this enables the entire screen assembly to be slid into the basket of the vibratory machine.

Figure 3:
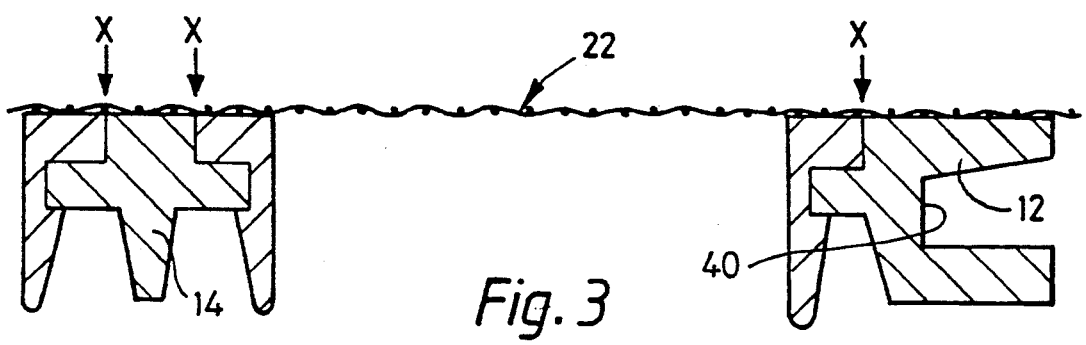
FIG. 3 is a view similar to FIG. 2, showing how the tensioned filter mesh may be formed.

Referring now to FIG. 3, there is illustrated one method of forming the tensioned filter meshes over the sub-frames 20 of the inserts.

With all the empty sub-frames in position in the principal frame 10, a single piece of filter mesh 22 is laid over the frame 10, and is then tensioned as required. Next, the mesh 22 is bonded or glued on to the upper surface of the position 26 of each sub-frame 20, but not to the principal frame. The mesh is then cut around the periphery of each sub-frame, as shown by the arrows X, and the surplus pieces of mesh are discarded, leaving the complete assembly ready for use.

Various modifications of the afore-described and illustrated arrangement are possible within the scope of the invention hereinbefore defined.

I claim:

1. A filter screen assembly comprising a principal frame divided by crosspieces into a plurality of equally sized sub-areas, each sub-area having formed on at least one crosspiece thereof an inwardly directed lip, and a corresponding plurality of screen inserts snap-fitted into engagement within said sub-areas, each insert having a sub-frame with a tensioned filter mesh securably attached thereacross, whereby the resulting twisting of the sub-frame upon interengagement with said lip serves to at least maintain the tension in the mesh.

2. An assembly according to claim 1, wherein said principal frame and sub-frames are of moulded plastics material.

3. An assembly according to claim 2, wherein the moulded plastics material is glass-fibre reinforced plastics material.

4. An assembly according to claim 3, wherein the plastics material is a mouldable polyester compound.

5. An assembly according to claim 1, wherein said principal frame is rectangular and is divided into said sub-areas of rectangular shape by crosspieces extending in mutually perpendicular directions parallel to its sides.

6. An assembly according to claim 5 in which a said lip is formed along the four inward sides of the crosspieces of each rectangular sub-area, and the sub-frames are formed with corresponding grooves.

7. An assembly according to claim 1 in which each sub-frame is formed with grooves for snap-fitting into said lip.

8. An assembly according to claim 1 in which each sub-frame is formed with a tapered dependent ledge to assist insertion over said lip.

9. An assembly according to claim 1 in which said lip is formed on opposite sides of each sub-area.

10. A method of enabling repair of a damaged filter screen assembly according to claim 1, in which when in use a filter mesh of an insert is damaged, the insert containing the site of damage is removed and is replaced by a fresh insert carrying an undamaged mesh.

* * * * *